Patented Mar. 30, 1937

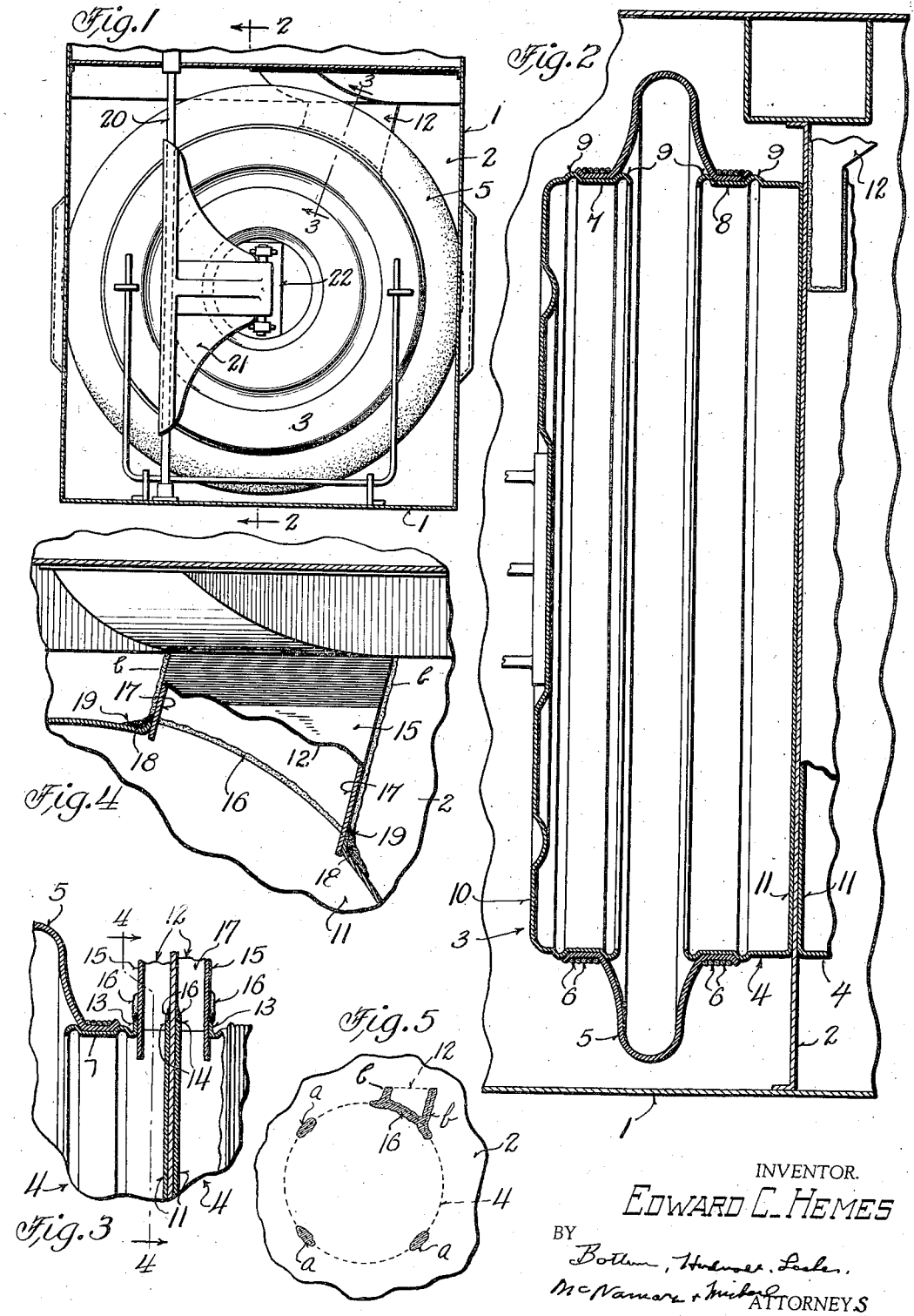

2,075,284

UNITED STATES PATENT OFFICE 2,075,284

GAS METER BELLOWS

Edward C. Hemes, Whitefish Bay, Wis.

Application September 19, 1935, Serial No. 41,271

2 Claims. (Cl. 73—278)

This invention relates to bellows for fluid metering devices, such as gas meters.

The general purpose and object of my invention is to provide a bellows construction of a character eliminating soldering in the bellows assembly and enabling the latter as a complete unit to be soldered to the supporting partition wall in the meter case by the external application of solder and at points sufficiently remote from the flexible diaphragm to prevent burning or scorching of the diaphragm by the conduction of heat through the header of the bellows secured to said partition wall. In addition to the last named advantage, the invention has the equally important advantage of reducing the lineal amount of solder required as compared to the bellows constructions heretofore employed.

In carrying out the objects of my invention, I provide the relatively movable headers for the diaphragm in the form of one-piece members which may be stamped or otherwise formed from the desired sheet material, whereby the body and marginal walls of the headers are integrally formed and require no soldering for their connection, thus affording no opportunity for burning or scorching the diaphragm when assembling the bellows.

A further object of my invention is to provide one of the headers, namely, the header which is secured to the partition wall, with a lip construction for the gas duct or throat-piece employed to connect the interior of the bellows with the valve seat of the metering device. This lip construction permits the throat-piece to be soldered to the header externally of the bellows and at points sufficiently remote from the header to prevent damage to the diaphragm by the heat conducted through the header.

My invention consists further in the matters hereinafter described and claimed.

In the accompanying drawing:

Fig. 1 is a front elevational view of a bellows constructed in accordance with my invention and shown in its position of use in a meter casing;

Fig. 2 is an enlarged transverse sectional view taken on line 2—2 of Fig. 1 to show the imperforate closures which the headers of the bellows provide in accordance with my invention;

Fig. 3 is a similar sectional view taken on line 3—3 of Fig. 1 to show the lip construction and its associated duct or throat-piece to be hereinafter described;

Fig. 4 is an enlarged section view taken on line 4—4 of Fig. 3 with parts in elevation to show the end formation of the lip construction; and Fig. 5 is a diagrammatic view indicating the manner in which the bellows and the throat-piece are soldered externally to the partition wall of the meter case.

In the drawing, 1 indicates the meter case and 2 an upright partition wall in said case. This partition wall, as in structures of this character, divides the meter case into the required two bellows chambers or compartments and provides a support for the bellows units which are mounted on the opposite sides of said partition wall as shown in Figs. 2 and 3.

The bellows unit of my invention comprises a pair of relatively movable circular headers 3, 4 secured to the opposite marginal portions of an interposed flexible diaphragm 5. This diaphragm, as in devices of this character, is preferably in the form of an annulus of flexible tanned leather, or other desired flexible material. The diaphragm 5 is secured to the headers 3, 4 in the usual manner as by multiple wrappings of string or other suitable cord-like material 6. These wrappings fasten the marginal portions of the diaphragm to the annular flanges 7, 8 of the respective headers, preferably between the beads 9, 9 thereon, as shown in Fig. 2.

The headers 3, 4, in accordance with my invention, are of cup-like form, being stamped or otherwise formed from single pieces of sheet metal or other desired sheet material. This provides the headers with the annular flanges 7, 8 heretofore mentioned, and solid, circular body walls 10, 11 integrally connected with the associated flanges and in substantially normal or right angular relation thereto, as shown. The body walls 10, 11 are solid and continuous throughout and provide with the flanges 7, 8 imperforate header-closures for the bellows, except for the opening provided in the flange of one of the headers for the passage of gas into and out of the bellows in its expanding and collapsing operation. The flanges 7, 8 project laterally from one side of the respective wall sections 10, 11 and extend into the diaphragm 5 for connection therewith, as shown. The connections are made gas tight by the wrappings 6 and shellac or other sealing medium as usual in these constructions.

The flange 8 of the header 4 is provided at one point in its circumference with an opening for the duct or throat-piece 12 used with the bellows to connect the interior of the bellows with the valve seat (not shown) in the upper compartment of the meter case. This opening is formed by a lip construction which may comprise a pair of lips 13, 14 integrally connected with the header 4 at the flange 8 and extending radially outwardly from said flange, as shown in Fig. 3. The lips are spaced apart axially of the flange and provide the opening for the lower end of the throat-piece 12 as shown. The inner lip 13 overlaps the body wall 15 of the throat-piece and is soldered thereto, as at 16, along the upper edge of the lip 13 when the parts are assembled on the partition wall 2.

The outermost lip 14 is preferably coplanar with the body wall 11 of the header 4 and bridges the throat-piece 12 on its open side when the parts are in assembled position. The throat-piece or duct 12 is channel-shape and is applied with its open side against the partition wall 2 to be closed thereby. The lower ends of the side walls of the throat-piece 12 are notched or cut-away (see Fig. 3) to accommodate the lip 14 and thus the edges of the side walls may engage the partition wall 2 and be soldered thereto to provide leak-proof joints, between the throat-piece and the partition wall as required.

The lip construction may be formed by slitting the flange 8 of the header 4 and then bending the lips into outwardly extending relation to the flange, or the entire lip formation may be formed by drawing the metal of the flange into a protuberance or neck of the shape and size desired completely surrounding the lower end of the throat-piece, as indicated in Fig. 4. With this construction, the ends of the protuberance provide fillets 18 fitting against the side walls 17 of the throat-piece 12 and soldered thereto, as at 19 as shown in Fig. 4.

When assembling the parts in the meter case, the bellows, in its completed form comprising the connected diaphragm and headers 3, 4, and 5, is first placed against the partition wall 2 with the imperforate body wall 11 of the header 4 against said partition wall. The bellows is arranged to have its lip construction uppermost to accommodate the throat-piece 12 when applied, whereupon the header 4 is externally soldered to the partition wall at a plurality of spaced points about the header 4, as indicated at *a, a* in Fig. 5. The lip 14 which lies against the partition wall is also soldered thereto, as indicated at 16 in Figs. 3 and 5. These solder connections are sufficient to secure the bellows in the meter case and being spotted about the header 4 reduces the lineal amount of solder required for the mounting as compared with the constructions heretofore employed, wherein the solder connection is a continuous ring about the flange which mounts the bellows on the partition wall. Moreover, the soldering in accordance with my invention is applied externally of the bellows and at points sufficiently remote from the flexible diaphragm 5 to prevent burning or scorching of the diaphragm by heat conducted through the header 4.

Following the soldering of the bellows to the partition wall 2, the throat-piece or duct 12 is next applied. The lower end of this piece is inserted in opening provided by the lip construction 13, 14 and then set against the partition wall 2, whereupon the throat-piece is soldered to the lip 13 at 16 and to the fillets 18 at 19 and to the partition wall 2 along the contacting edges of the walls 17 at *b, b* in Figs. 4 and 5. All of the soldering is applied externally of the bellows, and at points sufficiently remote from the diaphragm 5 to prevent burning or scorching thereof by the heat conducted through the header 4.

With the headers 3, 4 in stamped or integral form no soldering is required to secure them in assembled relation with the diaphragm as heretofore and thus no opportunity is afforded for burning or scorching the diaphragm or impairing its gas tight connection with the headers. All soldering required is applied externally or exteriorly of the bellows 1 and being confined to the header 4 and the throat-piece or duct 12 lessens the amount of solder employed and reduces the installing costs. Moreover, the bellows unit is considerably simplified and may be installed and repaired with more ease and at less expense than the constructions heretofore employed.

In the assembled construction, the header 3 constitutes the movable header of the bellows. This header is suitably connected with the parts of the valve operating mechanism located in the chamber containing the bellows. This mechanism, as indicated in Fig. 1, includes a vertical rock shaft 20 provided with a flag bracket 21 which, by flag carriage 22, pivotally connects the header 3 at its wall section 10 to the bracket 21. The latter is fixed to the shaft 20 to turn with the same as the bellows expands and collapses in the operation of the meter.

The opening afforded by the lip construction also enables the lubricant used to dress the diaphragm to be entered into the bellows unit to treat the inner surface of the diaphragm. The outer surface of the diaphragm may also be treated with this lubricant.

The details of construction and arrangement of parts shown and described may be variously changed and modified without departing from the spirit or scope of my invention, except as pointed out in the annexed claims.

The invention claimed is:

1. In a gas meter, in combination, a partition wall, a three sided gas conveying duct applied to said wall with the wall closing the open side of the duct, an expansible and contractible bellows unit mounted on said partition wall in association with said duct and having a header having a surrounding marginal flange extending outwardly from said wall, and lips struck outwardly from said flange to provide an opening into the bellows unit for said duct, said duct extending into said opening and being externally soldered to said lips and to said partition wall, one of the lips extending across the open side of the duct between the duct and the partition wall, said header being externally soldered to said partition wall along said last named lip and at one or more spaced points about the outer periphery of the header to mount the bellows unit on the partition wall.

2. In a gas meter, in combination, a partition wall, a three sided gas conveying duct applied to said wall with the wall closing the open side of the duct, an expansible and contractible bellows unit mounted on said partition wall in association with said duct, said unit having inner and outer one piece headers, each having an imperforate body wall providing a closure for the header and a surrounding marginal flange extending inwardly from the body wall, a flexible ring shaped diaphragm disposed between the headers and secured to the flanges thereof, and lips struck outwardly from the flange of the inner header between its body wall and the connection of the diaphragm to the flange to provide an opening into the bellows unit for the duct, said duct extending into said opening and being externally soldered to said lips and to said partition wall, one of the lips extending across the open side of the duct between the duct and the partition wall, said inner header being externally soldered to the partition wall along said last named lip and at one or more spaced points about the outer periphery of the inner header adjacent the junction of its body wall and marginal flange to mount the bellows unit on the partition wall.

EDWARD C. HEMES.